United States Patent [19]

Peffer et al.

[11] 4,294,104

[45] Oct. 13, 1981

[54] FRICTION DRIVE FORCE MEASUREMENT FIXTURE

[75] Inventors: Robert M. Peffer, Penfield; Charles H. Braun, Webster, both of N.Y.

[73] Assignee: Eastman Kodak Company, Rochester, N.Y.

[21] Appl. No.: 89,687

[22] Filed: Oct. 30, 1979

[51] Int. Cl.³ ............................................ G01N 19/02
[52] U.S. Cl. ........................................................... 73/9
[58] Field of Search ....................... 73/9, 117; 33/182; 355/76

[56] References Cited

U.S. PATENT DOCUMENTS 3,555,895  1/1971  Schmidt ........................ 73/141 AB
3,826,129  7/1974  Wiss ...................................... 73/117

*Primary Examiner*—James J. Gill
*Attorney, Agent, or Firm*—Lawrence P. Kessler

[57] ABSTRACT

A fixture for measuring the drive forces of a friction drive apparatus. The fixture comprises a first member having a first surface adapted to be located in juxtaposition with the friction drive apparatus. A reaction member is movably supported on the first member such that when the first member is in juxtaposition with the friction drive apparatus the reaction member is in engagement with the friction drive apparatus. The reaction member is movable relative to the first surface in response to the driving force of the friction drive apparatus. The reaction member includes reference means for indicating the relative position of the reaction member and the first surface. The reaction member is urged toward a rest position on the first surface. The magnitude of the urging force is proportional to the displacement of the reaction member from the rest position by the driving force. Thus the position of the reference means relative to the first surface indicates the magnitude of the driving force on the reaction member. Particularly, the first surface may bear reference indicia and the reference means may be a mark associated with the reference indicia.

7 Claims, 5 Drawing Figures

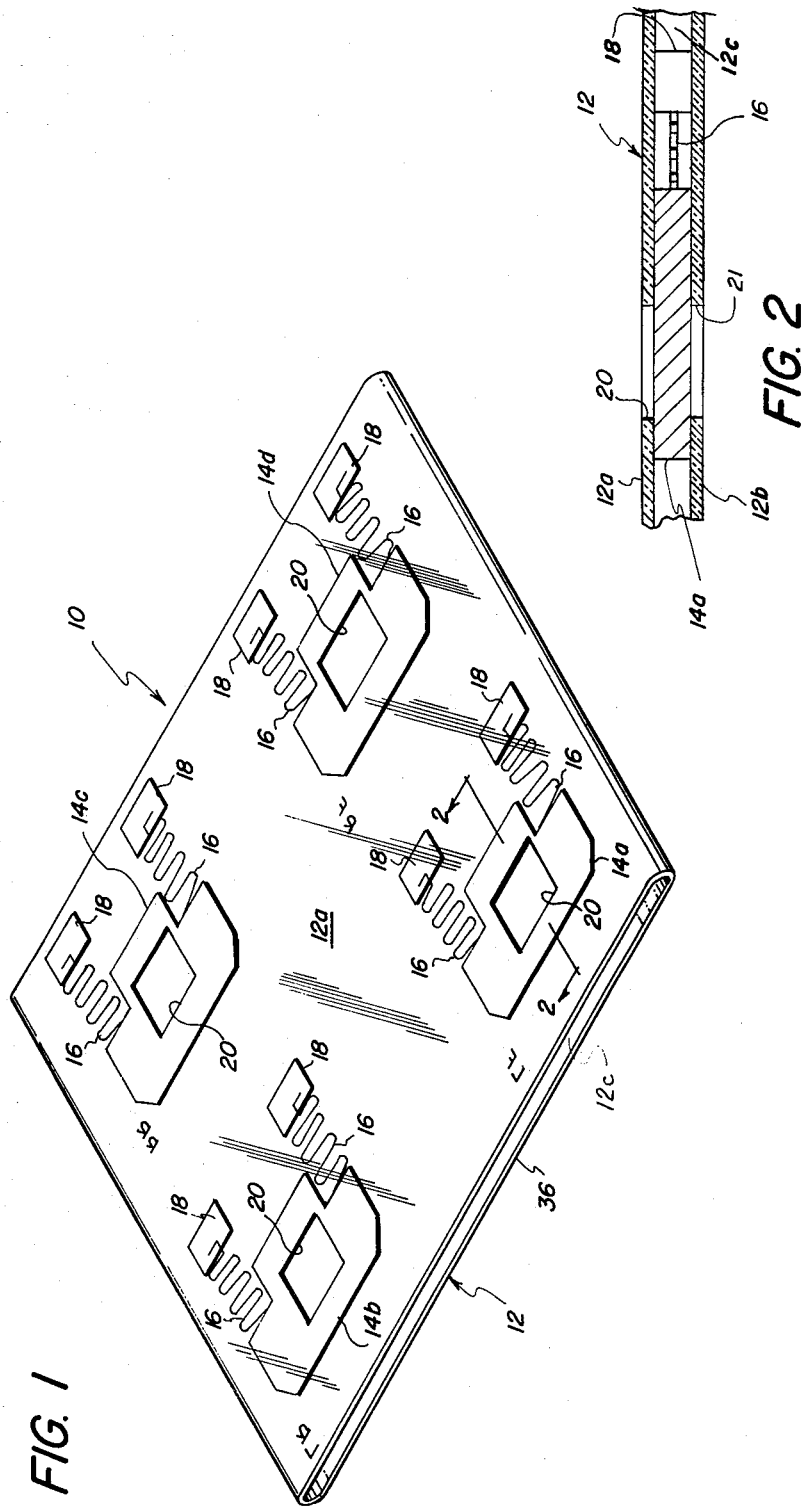

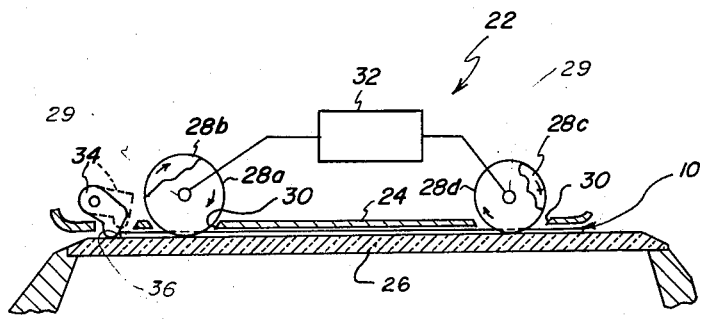
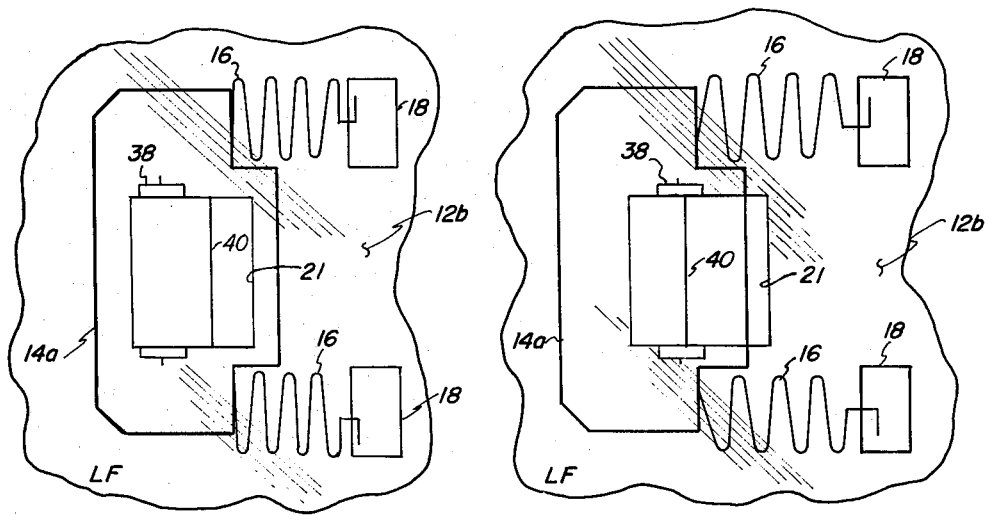

FRICTION DRIVE FORCE MEASUREMENT FIXTURE

BACKGROUND OF THE INVENTION

This invention relates generally to measuring driving forces, and more particularly to a fixture for measuring the driving forces imparted to a sheet by a friction sheet feeding apparatus.

Certain typical mechanisms for feeding sheets in common use today employ friction driving forces to transport the sheets. For example, to improve productivity of modern high speed reproduction equipment, such as copier/duplicators, mechanisms have been provided for friction feeding original document sheets to the exposure platen. One such original document sheet feeder is shown in U.S. Application Ser. No. 647,683, filed Jan. 8, 1976, in the name of Matthew J. Russel. This feeder sequentially removes original document sheets from a supply stack, delivers the sheets seriatim to a registration position on the exposure platen, and returns the sheets to the stack after images thereof have been recorded. Feeding of the sheets across the platen is by a plurality of rotating friction rollers imparting driving forces to the sheets. Of course, feeding could be accomplished by other types of friction drives such as moving belts.

While friction feeding of original document sheets has proven to be generally successful in delivering sheets to the registration position on the exposure platen, accurate adjustment of the friction feed is required to insure proper transport of the sheets. Specifically, if the friction driving forces imparted to the document sheets are not high enough, the feeder may slip relative to the sheets and the sheets will not reach the registration position; and if the friction driving forces are to high, the sheets may be damaged, or may develop a sufficiently high triboelectric charge as they move across the platen so as to become tacked to the platen thus inteferring with the feeding action. Although coarse adjustment of the friction driving forces of the feeder is provided by particular selection of the material of the friction drive and its general location relative to a sheet being fed, fine tuning of the forces is typically accomplished by trial-and-error adjustment of the specific location of the friction drive to change the normal force of the sheets. Such trial-and-error adjustment has not proven highly satisfactory when particularly accurate feeding forces are desired.

Various apparatus are known for measuring friction driving forces of rotating members (see, for example, U.S. Pat. Nos. 1,775,076 and 1,831,198). However, such apparatus have not been found suitable for measuring the driving forces of document sheet feeders of the above described type. This is due to the minimal space available when the feeder is operatively positioned over the exposure platen and the inability of such apparatus to accurately duplicate the operative function of the friction drive so as to give a true picture of the driving force action during normal operation.

SUMMARY OF THE INVENTION

This invention is directed to a fixture for measuring the driving forces of a friction drive apparatus. The fixture comprises a first member having a first surface adapted to be located in juxtaposition with the friction drive apparatus. A reaction member is movably supported on the first member such that when the first member is in juxtaposition with the friction drive apparatus the reaction member is in engagement with the friction drive apparatus. The reaction member is movable relative to the first surface in response to the driving force of the friction drive apparatus. The reaction member includes reference means for indicating the relative position of the reaction member and the first surface. The reaction member is urged toward a rest position on the first surface. The magnitude of the urging force is proportional to the displacement of the reaction member from the rest position by the driving force. Thus the position of the reference means relative to the first surface indicates the magnitude of the driving force on the reaction member. Particularly, the first surface may bear reference indicia and the reference means may be a mark associated with the reference indicia.

BRIEF DESCRIPTION OF THE DRAWINGS

In the detailed description of the preferred embodiment of the invention presented below, reference is made to the accompanying drawings, in which:

FIG. 1 is top view in perspective of the friction driving force measuring fixture according to this invention;

FIG. 2 is a side elevational view in crosssection of a portion of the fixture of FIG. 1 taken along lines 2—2;

FIG. 3 is a generally schematic side elevational view of a friction drive apparatus with the fixture of this invention positioned to measure the driving forces of the apparatus;

FIG. 4 is a bottom view of a portion of the fixture showing the reaction member at rest; and FIG. 5 is a bottom view, similar to FIG. 4, showing the reaction member moved by the friction drive apparatus.

DESCRIPTION OF THE PREFERRED EMBODIMENT

Referring now to the drawings, FIGS. 1 and 2 show a fixture 10 for measuring the driving forces imparted to sheets by a friction drive apparatus for transporting such sheets. The fixture 10 comprises a receptacle 12, such as an envelope, for example, of transparent material made of polyethelene terephthalate. The receptacle has a pair of interconnected planar members 12a and 12b defining a pocket 12c therebetween. A plurality of reaction members 14a-14d are positioned within the pocket 12c and are movable relative to the planar members. The reaction members are paper of a typical weight and grade (e.g., 20 pound, xerographic bond) so as to be representative of the sheets fed by the friction drive apparatus. A plurality of tension springs 16 are connected at one end of the plurality of reaction members respectively and at the opposite end to a plurality of holders 18 respectively fixed, within the pocket 12c, to the members 12a, 12b. The springs 16 are of flat serpentine shape (may be made of steel, for example) bonded to the reaction members and holders by epoxy, for example. The springs 16 urge the reaction members 14a-14d to a rest position (see FIG. 4). The members 12a, 12b of the receptacle 12 have a plurality of openings 20 and 21 respectively overlying the reaction members. The openings 20 are positioned so that when the fixture 10 is located between a support surface and a friction drive apparatus, the drive members of the apparatus engage the reaction members 14a-14d through the openings and the reaction members engage the support surface through the openings 21.

As an illustrative example, the friction drive apparatus may be a recirculating document feeder 22 as described in the above-identified U.S. Patent Application Ser. No. 647,683. In FIG. 3 the portion of such recirculating feeder pertinent of this invention is schematically illustrated. The feeder 22 includes a guide plate 24 spaced above the transparent platen 26 of a reproduction apparatus such as an electrophotographic copier. Friction rollers 28a-28d are supported on shafts 29 carried by the feeder 22 and extend through openings 30 in the plate 24 to contact the platen 26. The shafts 29 are vertically adjustable (in any well-known manner) for regulating the normal force of the rollers on the platen. The friction rollers are continuously driven by a motor 32 to feed document sheets seriatim along the path between the plate 24 and the platen 26. A registration gate 34 is selectively movable to a position intercepting the sheets in the path to stop the sheets for copying, or to a position out of the path so that the sheets are moved off the platen when copying is completed.

The fixture 10 is capable of independently measuring the driving forces of each of the friction rollers so that the rollers can be individually adjusted (by vertically adjusting the shafts 29) to effect proper feeding of the document across the platen. To accomplish such measurement, the fixture 10 is placed on the platen 26 with the edge 36 of the receptacle 12 against the registration gate 34 (located in its sheet intercepting position). The receptacle is thin enough to fit between the plate 24 and platen 26 without interference. The member 12a faces upwardly (in the drawing) and is located so that the friction rollers 28a-28d engage the reaction members 14a-14d respectively through the openings 20 and the reaction members engage the platen through openings 21. When the motor 32 is activated to rotate the friction rollers, the rollers move the reaction members against the urging of the springs 16 from their respective rest positions (see FIG. 4). The constant of the springs 16 is selected so that the magnitude of the urging forces applied to the reaction members is proportional to the displacement of the reaction members from their rest positions by the driving forces. Therefore, the rollers move the reaction members respectively to an instantaneous equalibrium position (see FIG. 5) where the driving forces balance the urging of the reaction members by the springs; thereafter the rollers slip on the reaction members. Since the reaction members are of paper representative of the sheets to be fed across the platen by the rollers, the action of the rollers on the reaction members gives a substantially true picture of the actual friction driving force action during normal operation.

The lower member 12b of the receptacle 12 has reference indicia 38 inscribed thereon adjacent to the reaction members 14a-14d. Correspondingly, the reaction members 14-14d have an inscribed reference line 40 facing the member 12b and associated with the reference indicia for indicating the relative position of the respective reaction members and the member 12b. The reference indicia, which is related to the constant of the springs 16, may be a direct reading scale of force or may be an indicator of a desired operating range (as shown) of roller friction drive for a particular drive apparatus. When the reaction members are moved by the friction rollers to the equilibrium position, the reference lines 40 establish a positive relative to respective indicia 38. Such relative positioning yields a readable indication of the magnitude of the driving forces of the rollers which can be viewed through the transparent platen 26. If the driving forces of any of the friction rollers are not within the desired operating range, appropriate vertical adjustment of the shafts 29 can readily be made to change the normal force of the rollers on the platen.

The fixture 10, in place on the platen 26, does not have any effect on the operation of the reproduction apparatus itself. Accordingly, the reproduction apparatus can be used to record an image of the fixture 10 on the platen. Because the rollers are continuously driven, the recorded image of the fixture includes, in effect, a picture of the relative positions of the reference lines 40 and indicia 38 (a positive readout of the friction driving forces exerted on the reaction members). Such positive readout of the driving forces obtained from the recorded image can then be used to determine any necessary adjustment of the rollers.

The invention has been described in detail with particular reference to a preferred embodiment thereof, but it will be understood that variations and modifications can be effected within the spirit and scope of the invention.

We claim:

1. Fixture for measuring the driving force of a friction drive apparatus, said fixture comprising:

a first member having a first surface including means for locating said first member in juxtaposition with said friction drive apparatus;

a reaction member movably supported on said first member such that when said first member is in juxtaposition with the friction drive apparatus said reaction member is in engagement with the friction drive apparatus and movable relative to said first surface in response to the driving force of the friction drive apparatus, said reaction member including reference means for indicating the relative position of said reaction member and said first surface; and means mounted on said first member for urging said reaction member toward a rest position on said first surface, the magnitude of force applied by said urging means being porportional to the displacement of said reaction member from said rest position by the driving force, whereby the position of said reference means relative to said first surface indicates the magnitude of the driving force on said reaction member.

2. The invention of claim 1 wherein said urging means comprises a resilient flat serpentine spring fixed at one end to said reaction member and at its opposite end to said first member.

3. The invention of claim 1 wherein said reaction member is of a material substantially the same as the material typically driven by the friction drive apparatus.

4. For use with an apparatus for feeding sheets between such apparatus and an opposed surface by continuously driving friction rollers engaging the opposing surface, a fixture for measuring driving forces of the friction rollers, said fixture comprising:

a receptacle, including a first portion having reference indicia inscribed thereon, said receptacle being readily received between the friction drive apparatus and opposed surface;

a plurality of reaction members movably supported within said receptacle, means for locating said receptacle in juxtaposition with said sheet feeding apparatus such that said reaction members are in engagement with the friction rollers respectively and movable relative to said reference indicia in response to the driving forces of the friction rollers, said reaction members including a plurality of reference marks inscribed on said plurality of reaction members respectively facing said first portion so as to be operatively associated with said reference indicia for indicating the relative positions of said reaction members and said first portion;

means, mounted within said receptacle connecting said plurality of reaction members to said receptacle, for respectively urging said reaction members toward a rest position within said receptacle, the magnitude of force applied by said urging means being proportional to the displacement of said reaction members from said rest positions by the driving forces, whereby the position of said reference marks relative to respective reference indicia indicates the magnitude of the driving forces on said reaction members.

5. The invention of claim 4 wherein said receptacle has spaced apart first and second members, said plurality of reaction members being located between said first and second members; and wherein said reference indicia is inscribed on said first member, and said first and second members have respective openings defined therethrough, the friction rollers engaging said reaction members through said openings in said first member and said reaction members engaging the opposed surface through said openings in said second member.

6. The invention of claim 4 wherein said urging means comprise a plurality of resilient flat serpentine springs fixed at one end to said plurality of reaction members respectively and at the opposite end of said receptacle.

7. The invention of claim 4 wherein said plurality of reaction members are of a material substantially the same as the sheets typically fed by the friction rollers.

* * * * *